United States Patent
Hamel et al.

(10) Patent No.: US 11,722,379 B2
(45) Date of Patent: Aug. 8, 2023

(54) SYSTEMS AND METHODS FOR A RESILIENT INFRASTRUCTURE SIMULATION ENVIRONMENT

(71) Applicants: Derek Hamel, Tempe, AZ (US); Nathan Johnson, Tempe, AZ (US); Anna Scaglione, Tempe, AZ (US); Mikhail Chester, Tempe, AZ (US); Gary Morris, Tempe, AZ (US); Emily Bondank, Tempe, AZ (US)

(72) Inventors: Derek Hamel, Tempe, AZ (US); Nathan Johnson, Tempe, AZ (US); Anna Scaglione, Tempe, AZ (US); Mikhail Chester, Tempe, AZ (US); Gary Morris, Tempe, AZ (US); Emily Bondank, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 84 days.

(21) Appl. No.: 16/808,139

(22) Filed: Mar. 3, 2020

(65) Prior Publication Data
US 2020/0287798 A1    Sep. 10, 2020

Related U.S. Application Data

(60) Provisional application No. 62/813,522, filed on Mar. 4, 2019.

(51) Int. Cl.
| | |
|---|---|
| H04L 41/14 | (2022.01) |
| H04L 9/40 | (2022.01) |
| H04L 41/22 | (2022.01) |
| H04L 41/147 | (2022.01) |
| G06F 3/0482 | (2013.01) |

(52) U.S. Cl.
CPC ......... *H04L 41/145* (2013.01); *G06F 3/0482* (2013.01); *H04L 41/147* (2013.01); *H04L 41/22* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 2009/0228253 | A1* | 9/2009 | Tolone | G06Q 10/10 703/6 |
| 2012/0105227 | A1* | 5/2012 | Angell | G08B 25/003 340/540 |
| 2018/0101407 | A1* | 4/2018 | Akella | G06F 9/5005 |
| 2019/0266297 | A1* | 8/2019 | Krause | G05B 23/0245 |
| 2021/0044863 | A1* | 2/2021 | Haifa | H04N 21/8358 |

OTHER PUBLICATIONS

Johnson, et al., Resilient Infrastructure Simulation Environment (RISE), Simulating Vulnerability and Designing Resiliency of Critical Interdependent Infrastructures, Arizona State University, Ira A. Fulton Schools of Engineering, 2018, 20 pages.
Abstract, Real-time Modeling and Analytics of Interdependent Power-Water Networks for Improved Infrastructure Resiliency, Presentation ID 19655, 2017, 1 page.

* cited by examiner

*Primary Examiner* — Mohamed A. Wasel
*Assistant Examiner* — Mohammad A. Mian
(74) *Attorney, Agent, or Firm* — Polsinelli PC

(57) ABSTRACT

Various embodiments of an infrastructure modeling system that simulates vulnerability of critical interdependent infrastructures are disclosed herein.

13 Claims, 5 Drawing Sheets
(4 of 5 Drawing Sheet(s) Filed in Color)

SYSTEMS AND METHODS FOR A RESILIENT INFRASTRUCTURE SIMULATION ENVIRONMENT

GOVERNMENT SUPPORT

This invention was made with government support under 1441352 awarded by the National Science Foundation and under N00014-15-1-2867 and N00014-18-1-2393 awarded by the Office of Naval Research. The government has certain rights in the invention.

FIELD

The present disclosure generally relates to an infrastructure modeling system; and in particular to an infrastructure modeling system that simulates vulnerability of critical interdependent infrastructures.

BACKGROUND

Urban infrastructure can be incredibly complex, involving multiple interdependent systems such as water, power, cyber, and defense infrastructures; all of which are vulnerable to environmental, human and cyber stressors and attacks. Failure or reduction of one system's functionality may cause issues regarding the functionality of other interdependent utility systems, depending on variable temporal and spatial factors. Experienced city planners and utility engineers may have the forethought to manage their infrastructures around other infrastructures, simultaneously considering danger points originating from potential external and internal stressors; however these networks are still prone to human error. While computational simulators exist that can predict how an individual system may respond to external stressors, the complex dynamics of coupled infrastructures are still evaluated mostly by human intuition and experience; experience which often comes with dangerous and costly failures in the past. Computational network design and operation modeling methods that not only consider external threats but also factor system inter-dependability are desirable for minimizing potential disaster scenarios.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

The disclosed system is a real-time simulation and training environment that enables utility planners and operators to test utility network design configurations and operating strategies to improve system resilience to environmental stressors, cyber-attacks, and kinetic attacks. City planners and utilities may use the disclosed system to evaluate how extreme events and attacks affect infrastructure, in order to plan more reliable and resilient systems for municipal, utility, island, and defense applications. Power and water utility operators may use the disclosed system for threat detection, adaptation, and response to reduce the incidence of failures and improve recovery time.

The disclosed system is unique in its ability to combine infrastructures into a single simulation, apply stressors such as natural disasters or cyber-attacks to the networks, and evaluate the effect of the applied stressors in steady-state and time series simulations. The disclosed system may also incorporate and understand the complex dynamics of coupled infrastructures and presenting the information to a user in textual, graphical, and geographic formats for quick and improved understanding.

Figure 1:
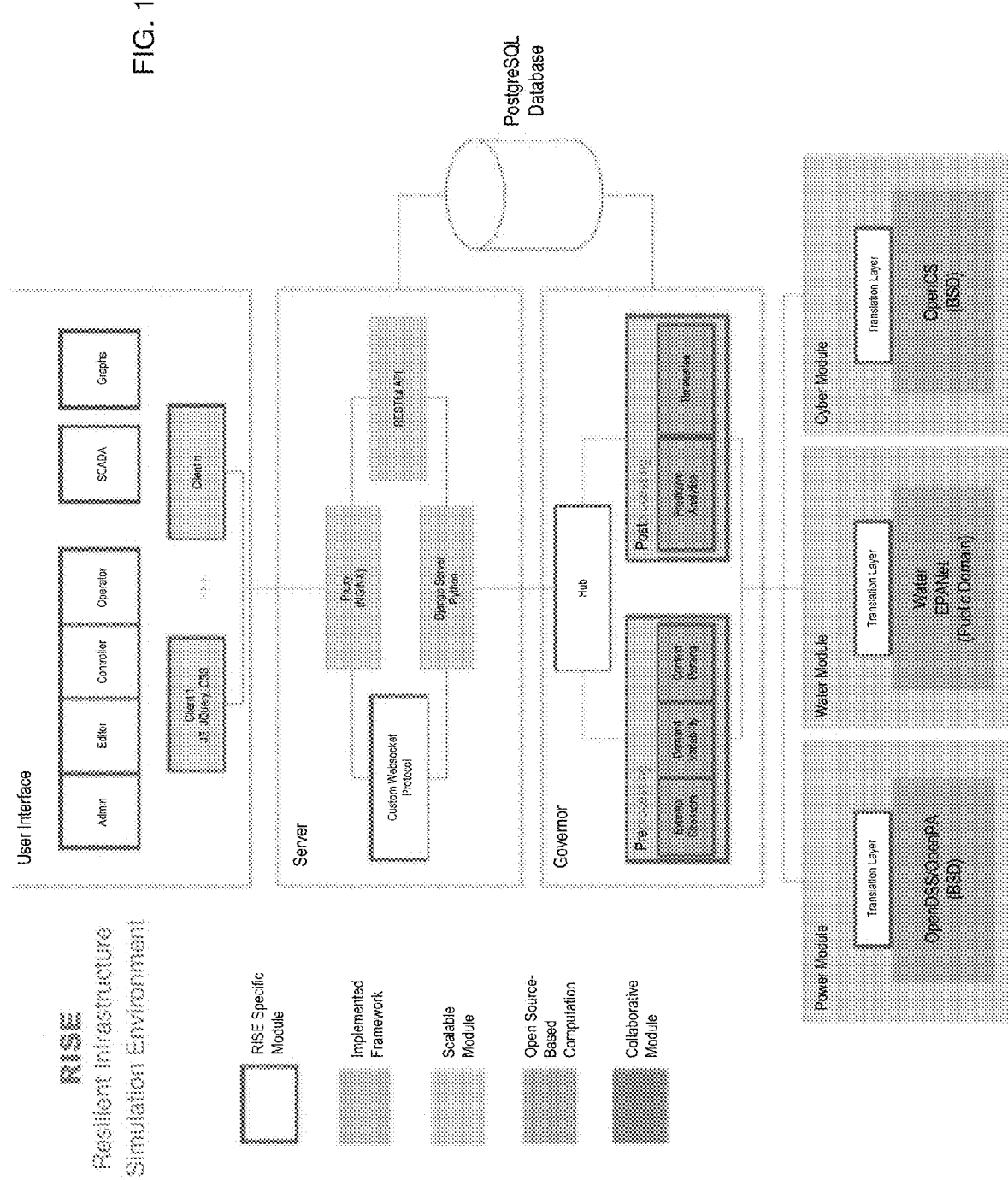
FIG. 1 is a flowchart showing the overall architecture of the disclosed model, involving a user interface block, a server block, a governor block, and several infrastructure simulator blocks.

One embodiment of the overall system is shown in FIG. 1. The system may include a user interface in operative communication with a server, where a user may add stressors or edit, view, or operate a plurality of utility networks. The system may also include a "governor" in operative communication with the server. The governor is configured to take the outputs of a plurality of modular native applications (individual infrastructure simulators representative of individual utility network responses to stressors) and incorporate the complex dynamics of each utility network response.

User Interface

The user interface may be embodied as an online environment which represents the primary source of user interaction with the system.

The user may have one or more roles: operator, controller, editor, and admin.

Operator:

A user in the operator role may experience simulations within sessions. The operator role may be the only role not capable of running calculations. They may also only have restricted access to inputs of some components. In short, the operator role may be utilized to just observe a simulation. The operator may also trigger automated stressors to the simulation in a self-guided learning mode.

Controller:

A user in the controller role may act as the "wizard behind the curtain" which controls the simulation that operators and other users experience. The controller may be capable of adding stressors to the simulation, and may change all inputs for components.

Figure 2:
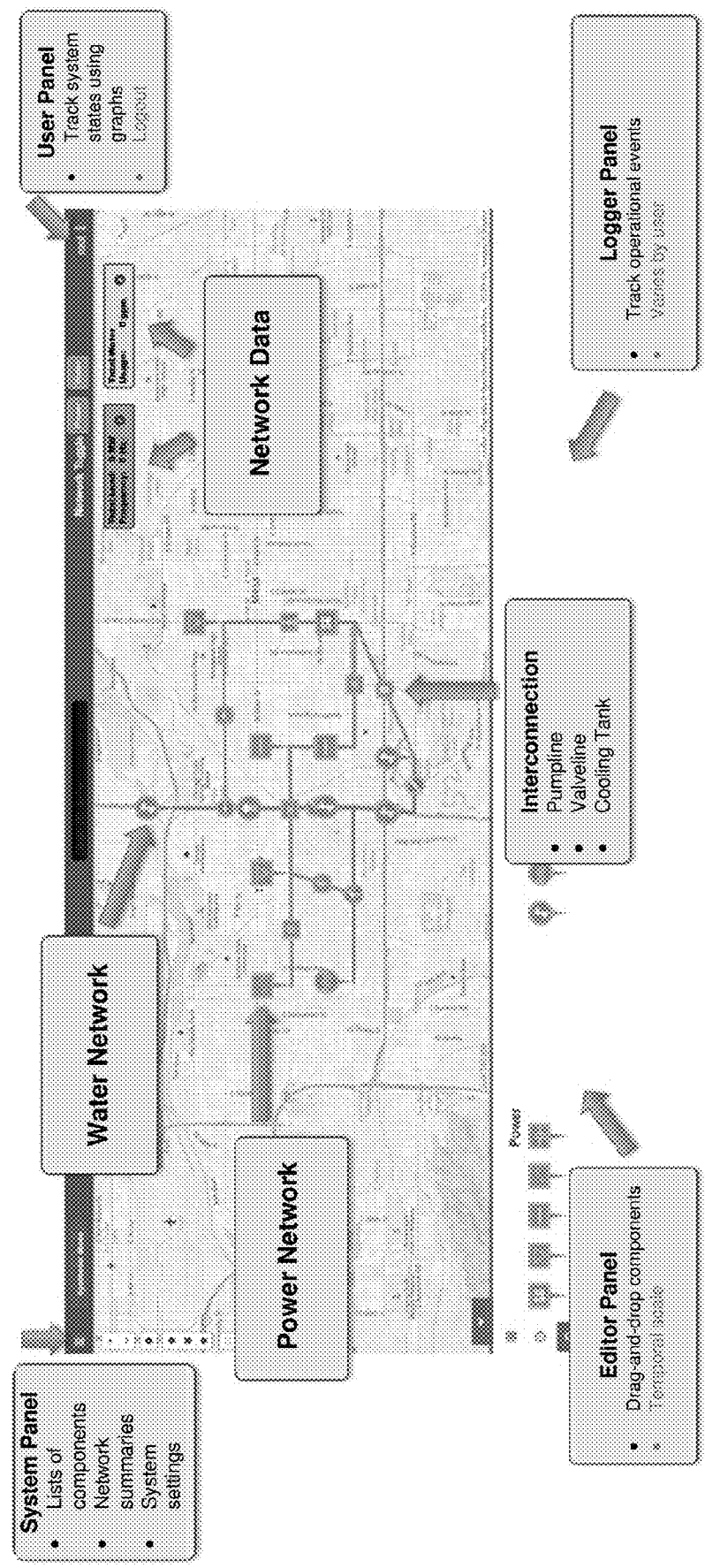
FIG. 2 is one embodiment of a User Interface web application module, configured for the user to build networks and interconnections for simulation.

Editor:

A user in the editor role may act as a utility network designer, with full control over session development. The editor role may be the only user capable of changing the topology of utility networks. An embodiment of the "editor" role's user interface screen is shown in FIG. 2.

Admin:

A user in the admin role is a separate user type and has no purpose beyond system administration. Admins may be directed to a different interface.

The user may sign in and choose a session or simulation to join, select a role, and enter the session to fulfill their selected role and tasks. The session may be viewed in a single web page application. The user may see a geographical map with associated functionality shown in a side panel which may give the user various degrees of control, based on the role the user selected.

Figure 3:
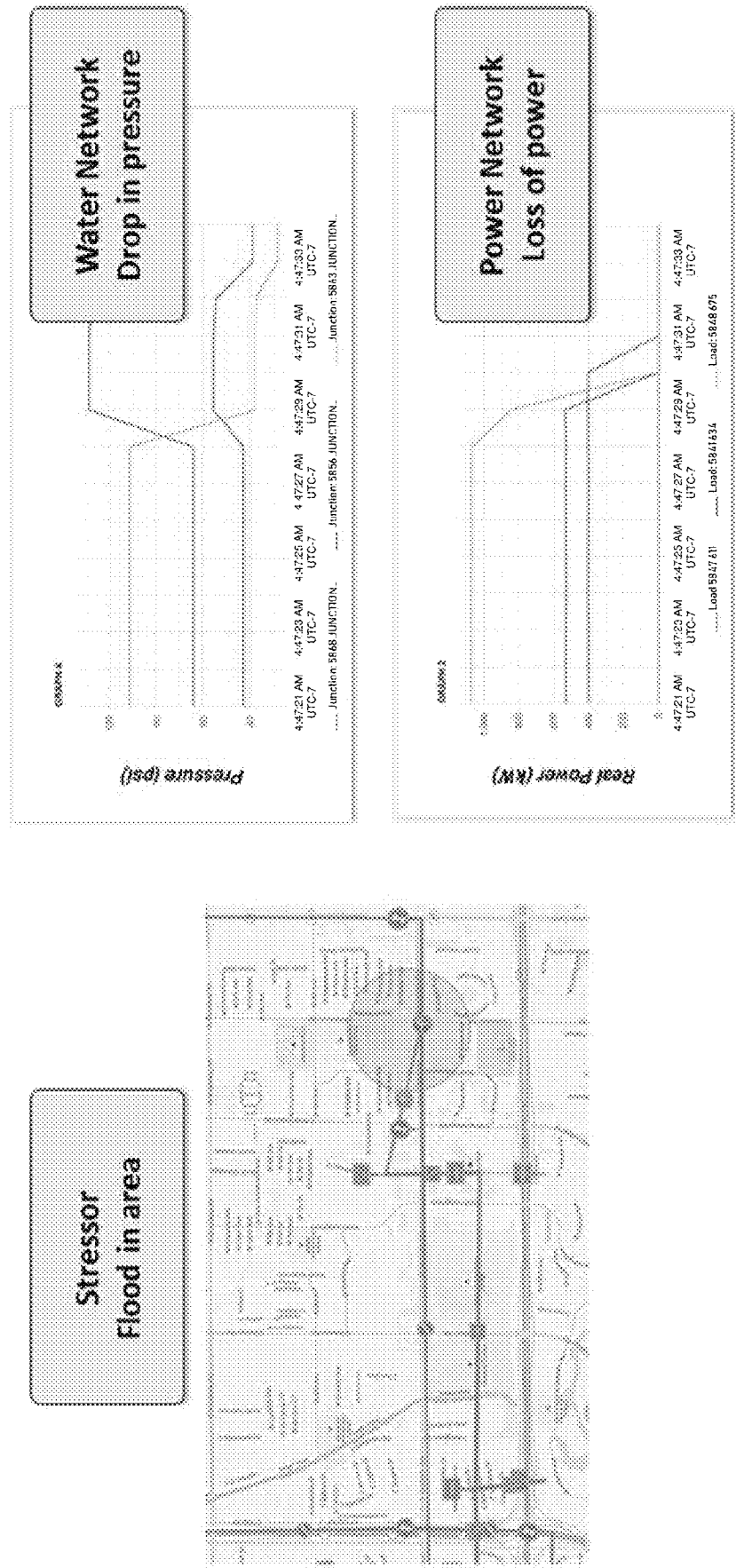
FIG. 3 is an illustration of power and water system consequences to a single stressor.

Stressors may be added to the map using icons. Depending on the type of stressor, the user may utilize this functionality to draw an area on the map that may describe stress for the components in the selected area. As shown in FIG. 3, the functionality may also include a generalized and customizable definition of effects on various components for area stressors, as well as stress on individual components, for the user's reference.

A menu may give access to a list of components by major and minor categories, as well as the current status of each component. Clicking on a component may navigate the user to the component on the geographical map and open the component's pop-up menu for more information. The pop-up menu may contain specifications and operating values for its respective component. The menu also contains information about the system, its settings, and global or static supporting component information, such as data regarding the wiring surrounding the component.

Components with related sub-components, such as substations or power plants, may use a secondary display with a Supervisory Control and Data Acquisition (SCADA) interface for detailed diagrams of components collocated at a single point on the GIS map.

Graphs may be accessed from the user menu and opened into another web page, allowing a user to see real-time data graphed separately in a secondary window from the map.

The user interface may also display abstract representations of networks like those of SCADA (supervisory control and data acquisition) interfaces commonly used and understood by industrial processes for component-by-component views of networks. The user interface may also provide responses from the governor in an audible format.

In one embodiment of the present disclosure, the user interface may be written in HTML, JavaScript, and CSS. It may use JQuery, LeafletJS, LeafletDraw, Leaflet-ant-path, Leaflet Dialog, OpenStreetMap, MapBox, Bootstrap, Moment, NoUISlider, and Materialize open-source frameworks and libraries.

Server

An embodiment of the server may be written in Python 3 using the Django, DjangoRestFramework, DjangoWebsocketRedis, and Psycopg2 open-source frameworks and libraries, along with dozens of pre-packaged open-source Python libraries such as "sys" and "datetime". The server may facilitate marshaling data between clients, the database, and simulation governors. This section may also include Redis and PostgreSQL servers to broadcast events and store data, respectively.

In one embodiment of the present disclosure, a custom communication dispatch for websocket clients is written in Python. Each websocket client may represent a user in a particular session. The dispatch may be operable to filter communication by session and purpose to quickly deliver information to intended targets. Websockets are particularly useful for handling keep-alive, threaded requests quickly without the overhead of HTTP 1.0. In this embodiment, the websockets utilize the DjangoWebsocketRedis framework to broadcast simulation events throughout the Redis server. Broadcasts are sent to every websocket client registered for each individual session.

Governor

Figure 4:
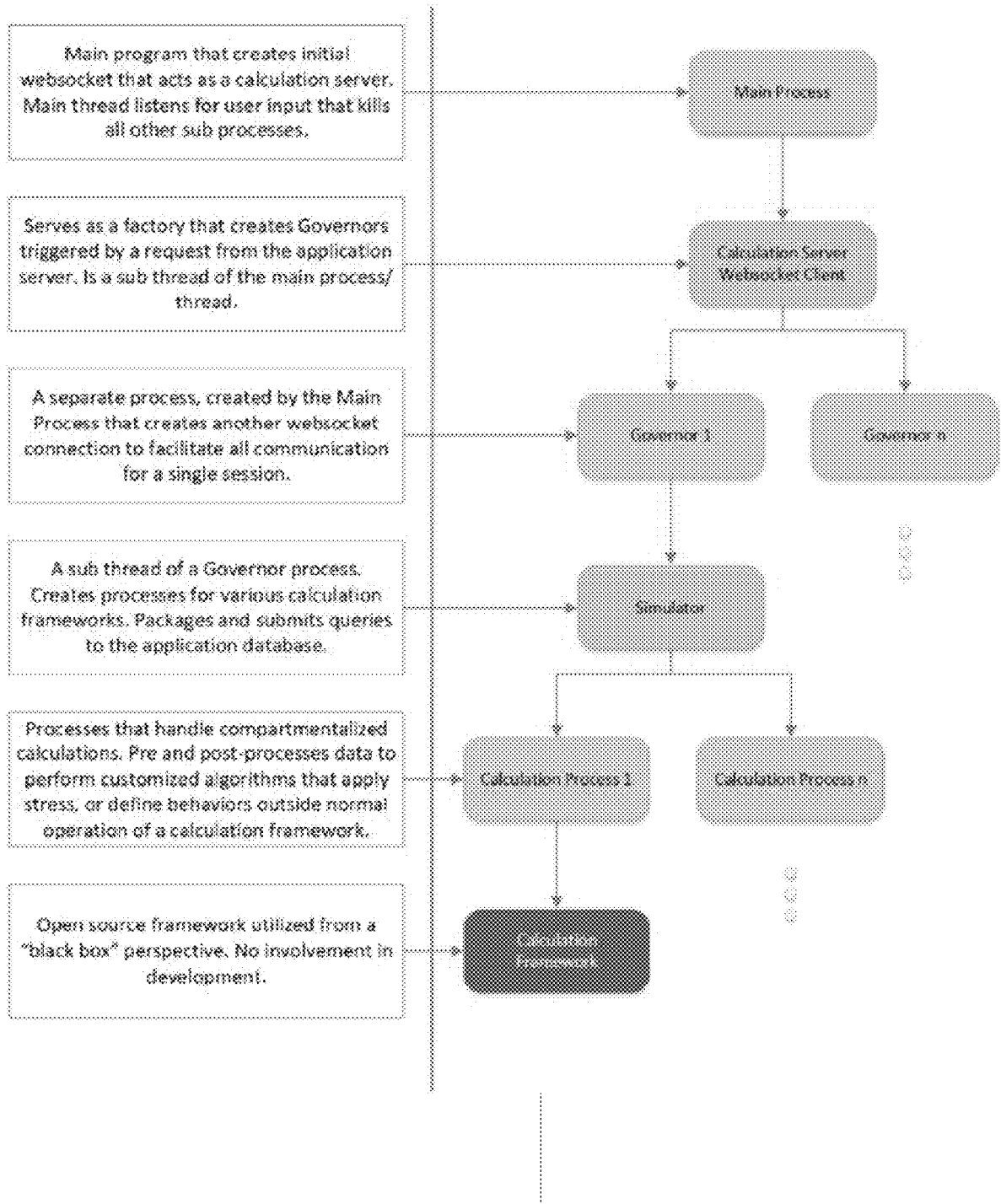
FIG. 4 is a flowchart showing the process for the governor block's calculation architecture.

The governor may be embodied as a standalone application built around modular native applications. The native applications chosen for one embodiment of the present disclosure, such as Open DSS and EPANet, provide physics-based representations of infrastructure behavior for the user. A governor may be created to control each session's simulation when an initial websocket client connection with the server is made. A session may be determined by a scenario where one or more users can experience a simulation through a single avenue of calculation and processing. Computational models of different infrastructures (such as power and water networks) may be computed separately in their native applications. Some session-level processing may be performed before and after these computations to determine the effects of user/system inputs and calculation outputs, respectively, to the single-infrastructure physics-based modules. To avoid file handling errors, communication interrupts, and computational issues such as race-through conditions and stack overflow, the client that spawns governors, the governors themselves, and each calculation may be separated into processes with multiple threads in each process. In other words, each process may use separate working directories and memory to execute code. A flowchart showing the governor's calculation architecture is shown in FIG. 4.

Computing System

Figure 5:
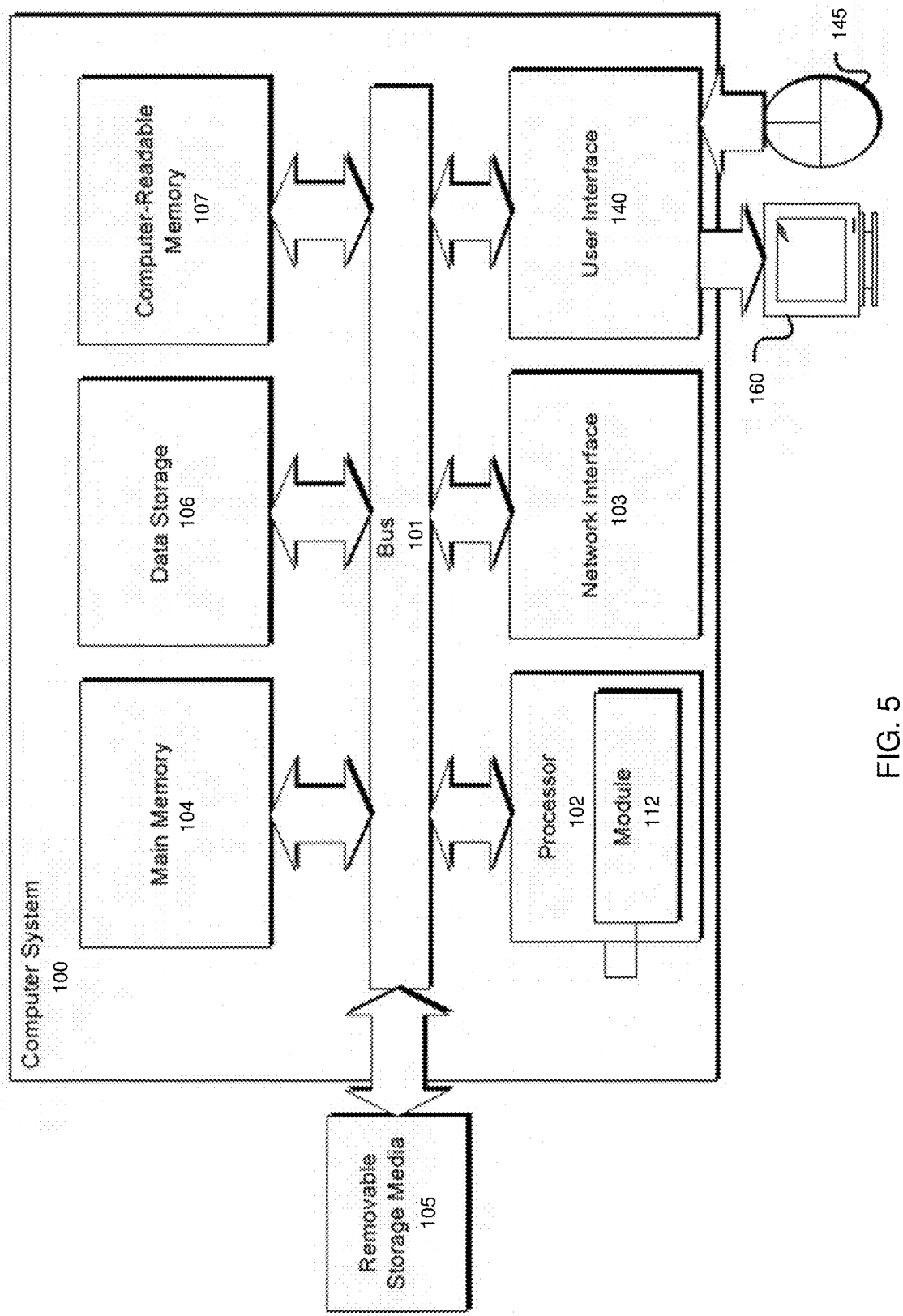
FIG. 5 is an illustration showing an exemplary computing system for effectuating functionalities of the system for real-time simulation and training environment.

FIG. 5 illustrates an example of a suitable computing system 100 used to implement various aspects of the present system and methods for a resilient infrastructure simulation environment. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 112. Such modules 112 are hardware-implemented, and thus include at least one tangible unit capable of performing certain operations and may be configured or arranged in a certain manner. For example, a hardware-implemented module 112 may comprise dedicated circuitry that is permanently configured (e.g., as a special-purpose processor, such as a field-programmable gate array (FPGA) or an application-specific integrated circuit (ASIC)) to perform certain operations. A hardware-implemented module 112 may also comprise programmable circuitry (e.g., as encompassed within a general-purpose processor or other programmable processor) that is temporarily configured by software or firmware to perform certain operations.

In some example embodiments, one or more computer systems (e.g., a standalone system, a client and/or server computer system, or a peer-to-peer computer system) or one or more processors may be configured by software (e.g., an application or application portion) as a hardware-implemented module 112 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 112 are temporarily configured (e.g., programmed), each of the hardware-implemented modules 112 need not be configured or instantiated at any one instance in time. For example, where the hardware-implemented modules 112 comprise a general-purpose processor configured using software, the general-purpose processor may be configured as respective different hardware-implemented modules 112 at different times. Software may accordingly configure a processor 102, for example, to constitute a particular hardware-implemented module at one instance of time and to constitute a different hardware-implemented module 112 at a different instance of time.

Hardware-implemented modules 112 may provide information to, and/or receive information from, other hardware-implemented modules 112. Accordingly, the described hardware-implemented modules 112 may be regarded as being communicatively coupled. Where multiple of such hardware-implemented modules 112 exist contemporaneously, communications may be achieved through signal transmission (e.g., over appropriate circuits and buses) that connect the hardware-implemented modules. In embodiments in which multiple hardware-implemented modules 112 are configured or instantiated at different times, communications between such hardware-implemented modules may be achieved, for example, through the storage and retrieval of information in memory structures to which the multiple hardware-implemented modules 112 have access. For example, one hardware-implemented module 112 may perform an operation, and may store the output of that operation in a memory device to which it is communicatively coupled. A further hardware-implemented module 112 may then, at a later time, access the memory device to retrieve and process the stored output. Hardware-implemented modules 112 may also initiate communications with input or output devices.

As illustrated, the computing system 100 may be a general purpose computing device, although it is contemplated that the computing system 100 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 102, a main memory 104 (e.g., a system memory), and a system bus 101 that couples various system components of the general purpose computing device to the processor 102. The system bus 101 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 100 may further include a variety of computer-readable media 107 that includes removable/non-removable media and volatile/nonvolatile media, but excludes transitory propagated signals. Computer-readable media 107 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 104 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 102. For example, in one embodiment, data storage 106 holds an operating system, application programs, and other program modules and program data.

Data storage 106 may also include other removable/non-removable, volatile/nonvolatile computer storage media. For example, data storage 106 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 100.

A user may enter commands and information through a user interface 140 or other input devices 145 such as a tablet, electronic digitizer, a microphone, keyboard, and/or pointing device, commonly referred to as mouse, trackball or touch pad. Other input devices 145 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 145 are often connected to the processor 102 through a user interface 140 that is coupled to the system bus 101, but may be connected by other interface and bus structures, such as a parallel port, game port or a universal serial bus (USB). A monitor 160 or other type of display device is also connected to the system bus 101 via user interface 140, such as a video interface. The monitor 160 may also be integrated with a touch-screen panel or the like.

The general purpose computing device may operate in a networked or cloud-computing environment using logical connections of a network interface 103 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device may be connected to a public and/or private network through the network interface 103. In such embodiments, a modem or other means for establishing communications over the network is connected to the system bus 101 via the network interface 103 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

A PowerPoint presentation entitled "Resilient Infrastructure Simulation Environment (RISE)—Simulating Vulnerability and Designing Resiliency of Critical Interdependent Infrastructures" is attached hereto as Addendum "A" which is herein incorporated by reference in its entirety.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
at least one computing device including one or more processors in communication with at least one memory, the at least one memory including instructions, which, when executed, cause the one or more processors to:
implement a model that generates an infrastructure simulation environment, wherein the one or more processors:
accesses a session associated with a client computing system via a predetermined communication dispatch connection that leverages websockets;
applies hypothetical stressors to the session based on input from a user interface including a cyber-attack to a plurality of coupled infrastructure networks associated with simulated infrastructures and display via the user interface a plurality of infrastructure network responses to the hypothetical stressors;
evaluates via a governor defined by the model a plurality of individual infrastructure network responses to the hypothetical stressors selected, examine one or more interconnections between coupled infrastructure systems, and incorporate one or more individual infrastructure network responses into each coupled individual infrastructure network response to combine the simulated infrastructures into a single simulation; and
facilitates, via a server defined by the model, communication between the user interface and the governor,
wherein to evaluate the plurality of individual infrastructure network responses to the hypothetical stressors the one or more processors leverage a governor calculation architecture, wherein
a main program including a main process creates an initial websocket that acts as a calculation server, and a main thread listens for user input that kills all other sub processes,
the calculation server serves as a factor that creates governors triggered by a request from an application server, the calculation server being a subthread of the main thread,
one or more of a governor processes defining a separate process created by the main process that creates another websocket connection to facilitate all communications for a single session,
one or more of a simulator processes defining a sub thread of the one or more governor process that creates processes for various calculation frameworks and packages and submits queries to an application database, and
one or more calculation processes that handle compartmentalized calculations, pre and post-processes data to perform customized algorithms that apply stress, or define behaviors outside normal operations of the calculation network.

2. The system of claim 1, wherein the processor displays one or more metric representations of infrastructure network vulnerability via the user interface.

3. The system of claim 2, wherein the metric representation of infrastructure network vulnerability includes one or more technical, financial, environmental, social or health metrics.

4. The system of claim 1, wherein the processor displays via the user interface the plurality of infrastructure network responses provided by the governor in a geographical format or abstract topology.

5. The system of claim 1, wherein the user interface displays the plurality of infrastructure network responses provided by the governor in textual format.

6. The system of claim 1, wherein the user interface displays the plurality of infrastructure network responses provided by the governor in graphical format.

7. The system of claim 1, wherein the user interface indicates the plurality of infrastructure network responses provided by the governor in an audible format.

8. The system of claim 1, wherein the user interface includes altered topologies representative of infrastructure networks.

9. The system of claim 1, wherein the processor evaluates the plurality of individual infrastructure network responses over a simulated period of time.

10. The system of claim 1, wherein a computing system executing the server communicates the hypothetical stressors and topologies representative of the infrastructure networks from the user interface to the governor for evaluation.

11. The system of claim 1 wherein under the predetermined communication dispatch a websocket communications protocol is leveraged such that each websocket client represents a user in the session and the predetermined communication dispatch filters communication by sessions and purpose to quickly deliver information to intended targets.

12. A method for resilient infrastructure modeling and simulated response, comprising:
   implementing by at least one processor a model for generating a resilient infrastructure environment, including executing operations comprising:
      generating a session associated with a client computing system via a predetermined communication dispatch, wherein the session simulates interdependencies associated with a plurality of simulated infrastructure networks within a single simulation, the session including a physics-based representation of infrastructure behavior for each of the plurality of simulated infrastructure networks; and
      evaluating, via a calculation performed by the at least one processor executing a governor calculation framework, effects of a stressor applied to the session to any of the plurality of simulated infrastructure networks,
   wherein the at least one processor creates a governor defined by the model that controls the single simulation of the session when an initial websocket client connection is made with the client computing system, the governor configured to take outputs of a plurality of modular native applications defining individual infrastructure simulators representative of individual utility network responses to stressors and incorporate complex dynamics of each utility network response into the session, and
   wherein the at least one processor implements the governor calculation architecture to evaluate the effects of the stressor applied to the session to any of the plurality of simulated infrastructure networks, the governor calculation architecture including
      a main program including a main process creates an initial web socket that acts as a calculation server, and a main thread listens for user input that kills all other sub processes,
   wherein the calculation server serves as a factor that creates governors triggered by a request from an application server, the calculation server being a subthread of the main thread,
   one or more of a governor process defining a separate process created by the main process that creates another websocket connection to facilitate all communications for a single session,
   one or more of a simulator process defining a sub thread of the one or more governor process that creates processes for various calculation frameworks and packages and submits queries to an application database, and
   one or more calculation processes that handle compartmentalized calculations, pre and post-processes data to perform customized algorithms that apply stress, or define behaviors outside normal operations of the calculation network.

13. The method of claim 12, wherein under the predetermined communication dispatch a websocket communications protocol is leveraged such that each websocket client represents a user in the session and the predetermined communication dispatch filters communication by sessions and purpose to quickly deliver information to intended targets.

* * * * *